C. B. ALBREE.
VALVE SYSTEM FOR HAMMERS.
APPLICATION FILED SEPT. 8, 1908.

932,421.

Patented Aug. 24, 1909.
6 SHEETS—SHEET 1.

WITNESSES
W. W. Swartz
R. A. Balderson

INVENTOR
C. B. Albree,
by Bakewell, Byrnes & Parmelee
his Attys.

C. B. ALBREE.
VALVE SYSTEM FOR HAMMERS.
APPLICATION FILED SEPT. 8, 1908.

932,421.

Patented Aug. 24, 1909.
6 SHEETS—SHEET 2.

WITNESSES
W. W. Swartz
R. A. Balderson

INVENTOR
C. B. Albree,
by Bakewell, Byrnes & Parmelee,
his Attys.

C. B. ALBREE.
VALVE SYSTEM FOR HAMMERS.
APPLICATION FILED SEPT. 8, 1908.

932,421.

Patented Aug. 24, 1909.
6 SHEETS—SHEET 3.

C. B. ALBREE.
VALVE SYSTEM FOR HAMMERS.
APPLICATION FILED SEPT. 8, 1908.

932,421.

Patented Aug. 24, 1909.
6 SHEETS—SHEET 4.

WITNESSES
W. W. Swartz
R. A. Balderson

INVENTOR
C. B. Albree,
by Bakewell, Byrnes & Parmelee,
his Attys

C. B. ALBREE.
VALVE SYSTEM FOR HAMMERS.
APPLICATION FILED SEPT. 8, 1908.

932,421.

Patented Aug. 24, 1909.
6 SHEETS—SHEET 5.

WITNESSES
W. W. Swartz
R. A. Balderson

INVENTOR
C. B. Albree,
by Bakewell, Byrnes & Parmelee,
his Attys.

C. B. ALBREE.
VALVE SYSTEM FOR HAMMERS.
APPLICATION FILED SEPT. 8, 1908.

932,421.

Patented Aug. 24, 1909.
6 SHEETS—SHEET 6.

UNITED STATES PATENT OFFICE.

CHESTER B. ALBREE, OF PITTSBURG, PENNSYLVANIA, ASSIGNOR TO THE CHESTER B. ALBREE IRON WORKS COMPANY, OF PITTSBURG, PENNSYLVANIA, A CORPORATION OF PENNSYLVANIA.

VALVE SYSTEM FOR HAMMERS.

932,421.   Specification of Letters Patent.   Patented Aug. 24, 1909.

Application filed September 8, 1908. Serial No. 452,107.

*To all whom it may concern:*

Be it known that I, CHESTER B. ALBREE, of Pittsburg, in the county of Allegheny and State of Pennsylvania, have invented a new and useful Valve System for Hammers, Motors, &c., of which the following is a full, clear, and exact description, reference being had to the accompanying drawings, forming part of this specification, in which—
Fig. 9
is a view similar to Fig. 3, showing a different method of arranging the ports.

My invention relates to the valve systems of tools, motors, pumps, etc., wherein the movement of a piston is controlled by a fluid-actuated valve.

The object of the invention is to provide a valve which shall be simple and positive in action, and shall be entirely controlled and actuated by live pressure of the fluid and shall not depend for its action on reduction of pressure by leakage ports, or on back-pressure or cushioned fluid pressure, as in ordinary constructions of such valves.

It is also designed to provide a valve which may be located at any convenient point or place in relation to the cylinder and piston, suitable ports being provided to communicate with the fluid pressure supply, the interior of the cylinder and the atmosphere.

A further important object of the invention is to provide such a valve system which will operate a piston of any desired length and with any desired length of stroke.

The valve may be inclosed in the valve box, located either axially or at any desired angle relative to the axis of the cylinder; or it may operate in a cylindrical chamber forming an integral portion of the cylinder or located wherever desired.

In my preferred form shown in the drawings, when the fluid pressures are equalized on the outer ends, the valve is shifted in the valve casing; thereafter when one outer end of the valve receives pressure and the other end has no pressure, the valve will remain in the same position and when both outer ends of the valve have no pressure on them, the valve will remain stationary in the same position.

In the drawings, referring to Figs. 1 to 4, in which I show the invention as applied to a long-stroke pneumatic hammer, 2 is the barrel of the pneumatic hammer, 3 the usual riveting die or tool loosely inserted in its outer end, and 4 the handle. Through this handle extends the supply port 5, for fluid pressure, this supply being controlled by any suitable valve, such as the spring-pressed valve 6, controlled by the trigger 7, pivoted in the outer portion of the handle.

Within the hub 8 of the handle is slipped a circular block 9, which is bored transversely with a circular hole to form the valve casing and receive the reciprocating valve 10. This valve is in the form of a hollow cylinder which moves over a stationary central plug which is preferably made in two parts 12 and 13, having a pin and socket connection. The cylindrical outer surface of the valve is provided with two broad grooves 14 and 15. The head 12 of the valve plug is larger than the head 13, and the valve hole to receive the plug has varying diameters as follows: The largest diameter is around the head 12, as shown at *a*. The next smaller diameter is in its lower portion at *b*, to receive the lower head 13. Between these larger differential diameters *a* and *b* are smaller diameter bores *c c'* which are smaller in diameter than either *a* or *b* and may be equal in diameter. These bores *c c'* are connected to each other by a small hole through which the connecting stem 16 of the plug extends. This stem fits the hole and prevents pressure fluid passing from one to the other. The heads of the plug abut against the end closures of the valve casing, which in this form comprise the hub walls of the handle. The plug is thus held against end movement, and has differential diameters fitting the differential diameters of the interior of the valve. The plug is at least as much longer than the valve as is the travel of the valve.

The valve is provided with various passages as follows: The passage 17 leads from the central exterior surface of the valve to the inner pressure surface 18. The passage 19 leads from a wider port 20 to the pressure surface 21 of the valve. In another port of the valve, the passage 22 leads from the exterior groove 15 to the valve pressure surface 23, and the passage 24, independent of passage 22, leads from the groove 14 to the pressure surface 25. In order to admit pressure fluid from the up-end of the valve to an inner face, I provide a port, preferably by reducing the head 12 of the plug in diameter in the portion 12$^e$, and the inner wall of the valve surrounding this upper portion is extended inwardly at 26, this portion 26 being arranged to fit upon the lower larger portion of the head 12 when the valve is moved to the other position shown in Fig. 3. The inlet supply port to the valve casing is shown at 27, 28 being a circular exhaust passage, having inwardly extending ports 29 and 30, leading through the valve casing. The passage 28 is open to the air at 31. In the walls of the valve chamber or valve box, are provided ports 32, 33, 34, 35 and 36 which may be in the form of holes or grooves extending entirely or partially around the valve chamber. In the form shown, they are circular grooves. The ports 32 and 36 connect through passage 28 to the atmosphere. Port 33 connects with a passage 37, leading into the adjacent end of the cylinder or barrel containing the piston 38. Port 34 connects with the passage 27 for the supply of live air. Port 35 connects with a long passage 39, leading within barrel wall to the outer port 40, leading into the cylinder at its outer end.

Ports 41 and 42 lead from the ends of the valve chamber respectively to ports 43 and 44, which extend within the cylinder wall and enter the cylinder through ports 45 and 46 at different points in the intermediate portion of the cylinder.

The inner end of the cylinder is closed by a circular projection 47 in the valve casing or block, and the opposite end of the cylinder is closed by the working tool 3.

The action of the valve in relation to the movements of the piston may be better explained by following a complete cycle of action during a complete forward and back stroke of the piston 38.

Figures 1, 4:
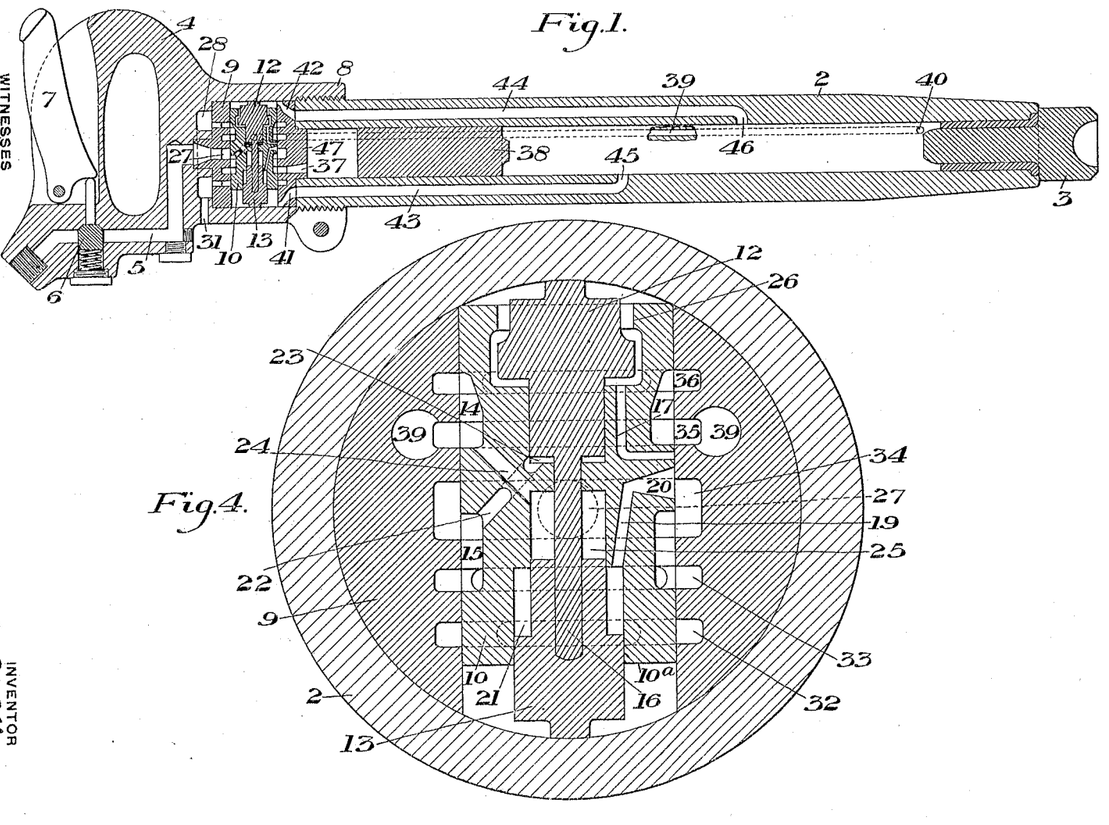
Figure 1 is a central longitudinal section of a long-stroke pneumatic riveter having a valve system constructed in accordance with my invention.
Fig. 4 is a cross section on the line IV—IV of Fig. 2.
Figure 2:
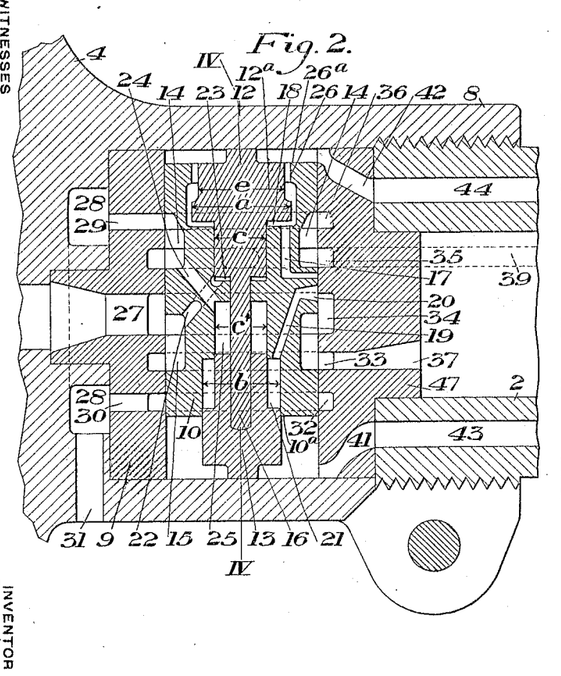
Fig. 2 is an enlarged section of the valve in the same position as in Fig. 1;
Figure 3:
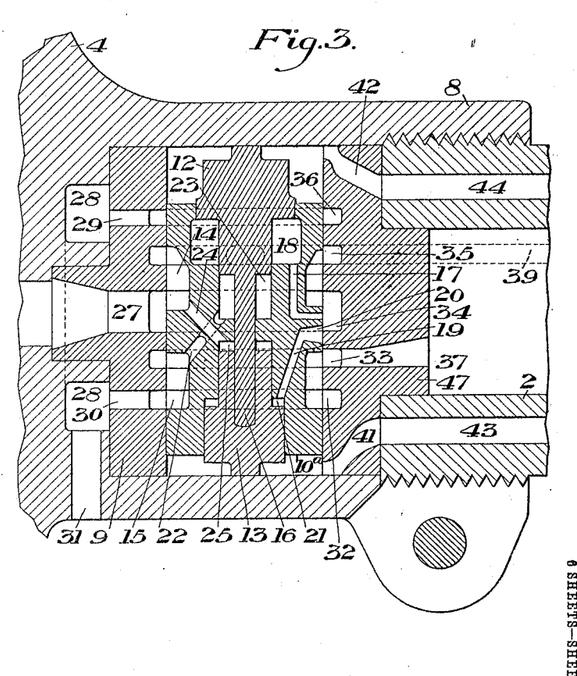
Fig. 3 is a view similar to Fig. 2, showing the valve in the opposite position.

Assuming the piston to be at the back end of its stroke, adjacent to passage 37, and that the valve is in the position shown in Figs. 1 and 2, which we will term the "up-end" of its stroke, the fluid pressure being admitted through the throttle valve 6, flows through passages 5 and 27, to port 34, thence around the grooved passage 15 into port 33 and through passage 37 into the back end of the cylinder. Under this pressure the piston moves forwardly in the cylinder and at this time the port 40 at the forward end of the cylinder and its supply passage 39 connects to port 35 and around grooves 14 to port 36, communicating directly to the atmosphere through exhaust passage 28. Hence at this time the front end of the cylinder is open to the atmosphere. The port 46 with its passage 44, leading to the top of the valve chamber, is also open to the atmosphere and no pressure is exerted on the up end of the valve. The port 45 and its passageway 43, leading to the down end of the chamber is also open to the atmosphere and hence there is no pressure on the lower end of the valve. In this position of the parts, the constantly open port 20 in the valve is open to the initial pressure from port 34 and conducts this pressure fluid to the inner pressure surface 21, this being an upward pressure on the valve. Port 17 is closed by the walls of the valve chamber and the upper chamber $a$ of the valve is open to port 42 and to the atmosphere, as above described. Port 22 leads from supply port 34 to the surface 23, imparting a down pressure on the valve, but as the surface 23 has less area than surface 21, also exposed to the initial pressure, the valve is held in the up position as long as ports 45 and 46 are open to the atmosphere. Now as the front end of the piston in its forward movement passes port 45, the atmospheric pressure is locked in the passage 43 and against the lower end of the valve at its lower face 10$^a$. This will not change the position of the valve, which will remain in its up position.

When in its further forward movement the rear end of the piston passes the port 45, live pressure fluid enters this port from behind the piston and flows through passage 43 and port 41, and presses up on the lower face 10$^a$ of the valve, thus holding the valve still more firmly in its up position. When the rear end of the piston passes the port 46, the live pressure fluid back of the piston, passes through the passage 44 and port 42 to the upper end of the valve, and presses against the surface at its upper end. Live fluid pressure now is imparted to each end of the valve, but as the valve is in its up position, where its inner upper cavity is open, this pressure fluid passes down to the surface 18. In this condition the surfaces 26$^a$, 18 and 23 have down pressure and surfaces 10$^a$ and 21 have up pressure. By the construction of the valve, the collective area of the down pressure surfaces is now greater than that of the up pressure surfaces, and the valve immediately moves down into the position shown in Fig. 3. In this down position the passage 37, connecting to port 33, communicates by groove 15 with exhaust port 32, and the air back of the piston is exhausted, as are also the spaces at each end of the valve chamber through ports 45 and 46 and passages connected therewith. The groove 14 in the valve now connects the initial supply port 34 with the port 35, leading through passage 39 and port 40 to the front end of the cylinder. This admits the initial fluid pressure to the front end of the piston. At this time exhaust port 36 is closed by the outer valve surface. In this position the upper cavity in the valve is closed at its upper end by the lower larger diameter $a$ of the plug head 12, but the port 17 receives initial supply pressure fluid from port 34, thus admitting the initial pressure to the pressure fluid surface 18. Port 24 now connects groove 14 which is open to initial supply, leading this supply to pressure surface 25. In this position there is pressure down on surface 18, and pressure up on surfaces 25 and 21, the surface 21 being always in connection with initial supply through the port 20 and passage 19. The end surfaces of the valve are open to the exhaust and the valve is so constructed that the combined areas of surfaces 25 and 21 are less than surface 18. Hence the valve is held down by the pressure. After the piston has thus passed the port 46, its velocity is checked either by the initial pressure supplied to its front end or by striking the tool. It stops and is forced back and continues its back travel under initial pressure fluid until its back end passes port 46. The atmospheric pressure is then locked in on the top of the valve. As soon as the front end of the piston passes port 46, live pressure fluid then flows through passage 44 and port 42, entering the upper end of the valve chamber and pressing on its upper end 26, holding it down more forcibly.

As the front end of the piston in its further travel now uncovers the port 45, the live pressure fluid flows through passage 43 to the lower end of the valve chamber, and the pressures become equal in the top and bottom ends of this chamber. In this position of the parts, live fluid pressure acts upwardly on the surfaces $10^a$, 21 and 25, and down pressure on surfaces 18 and $26^a$. The area of the three up pressure surfaces being now greater than the area of the down pressure surfaces, subjected to the same live fluid pressure, the valve moves to its up position.

When at the upper end of its stroke, groove 14 connects exhaust port 36 with port 35, passage 39 and port 40, relieving pressure on the front end of the piston and at the same time, by ports 45 and 46 and their passages, the pressure fluid is exhausted from the ends of the valve chamber. The upper inner cavity $a$ of the valve is now again opened, thus relieving pressure on surface 18, while port 17 is closed by the walls of the valve chamber. The port 24 exhausts through groove 14 and exhaust port 36, and ports 22 and 20 register with the inlet port 34, thus admitting fluid pressure to the surfaces 21 and 23. The surface 21 is greater than surface 23, and hence the valve is still held up. Pressure being admitted by groove 15 from inlet 34 to port 33 and passage 37, to the back end of the cylinder, the back stroke of the piston is cushioned and its movement reversed. This brings the cycle of movements to its original position. This cycle of movements is repeated as long as the supply of fluid under pressure is admitted. The rapidity of action depends upon the length of the stroke, the weight of the piston and the work done thereby, and the initial pressure of the live air or other motive fluid. It will be seen that the ports 45 and 46, entering the cylinder may be located at different points, thereby permitting the regulation of stroke-length, as desired, in any particular tool or cylinder. It will also be seen that the piston may be very short and the stroke very long, or the piston long and the stroke short. A plurality of ports 45 connected by suitable passage may be used and also a plurality of ports 46, suitably connected may be used, without affecting the action of the valve. There may also be a plurality of the main ports and their passages and live pressure air may be admitted to surface 21 from the intermediate portion of the cylinder, by grooves around lower ends of valve and plug, similar to those on top end, as will be shown later, thus taking the place of the constantly open port 20.

Figure 5:
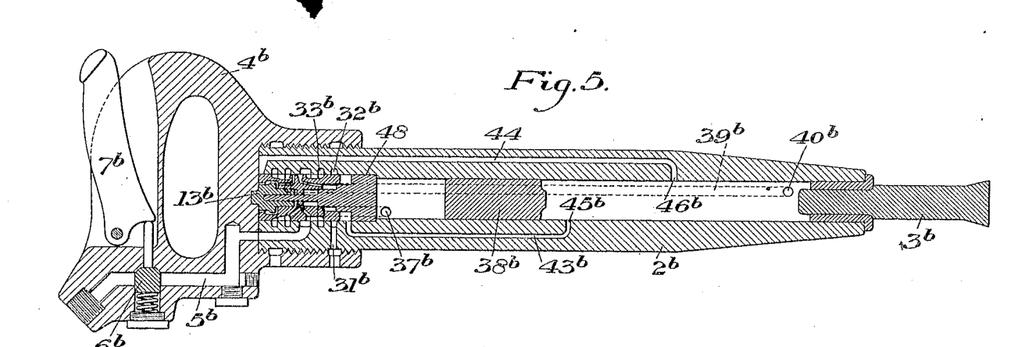
Fig. 5 is a view similar to Fig. 1, showing another arrangement and location of the valve.

In Fig. 5, I show another form of the valve applied to the pneumatic hammer or riveter, in which parts similar to those of Figs. 1 to 4 are designated by similar numerals with the letter $b$ applied thereto. In this form, the cylinder $2^b$ itself containing the piston is used as a valve chamber, being counterbored to a larger diameter in its rear portion, as shown at 48. This counterbored portion is provided with the same grooves, ports and passages as are shown in the valve block of Figs. 1 to 4. In this case, the inlet passage $37^b$ at the back end of the cylinder, leads through the wall of the barrel, opening in front of the valve at one end, while its rear end opens into port $33^b$. In this form, the axis of the valve coincides with the axis of the piston and the valve is slid into the end of the barrel before the barrel is screwed into the hub of the handle.

Figure 6:
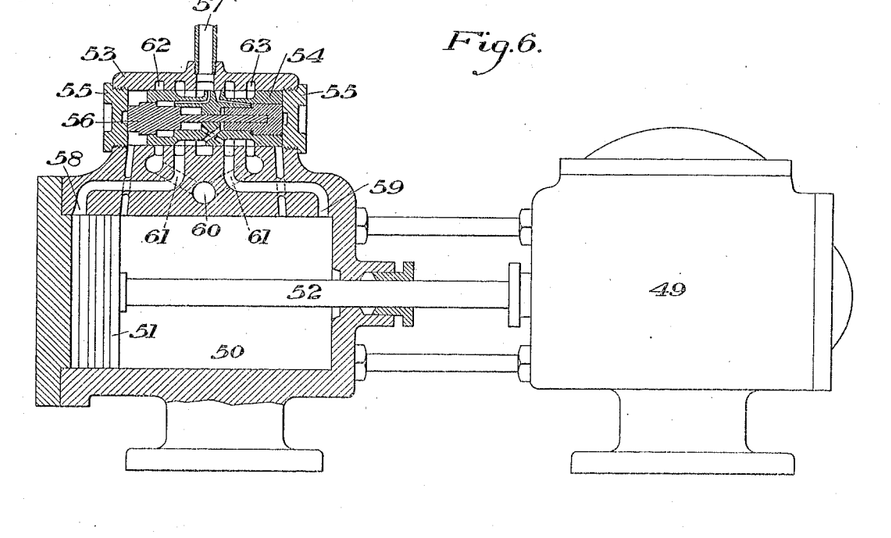
Fig. 6 is a sectional view showing my valve system applied to a pump.

In Fig. 6, I show the invention as applied to a pump. In this case, 49 is the pump cylinder, and 50 the motive cylinder containing the piston 51, whose piston rod 52 is extended and connected to the piston in the pump cylinder. In this case, the valve casing takes the form of a steam chest, 53, cast integral with the cylinder. The steam chest portion is then bored through to receive the valve 54, the ends of the valve casing being shown as closed by screw plug 55. The plug 56 within the valve might in this case be formed integrally with the screw plug. In this case, 57 is the inlet for motive fluid, which may be air, steam, water or other fluid, and 58 and 59 are the main ports leading from the valve into the ends of the cylinder. 60 is the exhaust connected by passages 51 to grooves 62 and 63, extending around the valve. In this form, the valve, the plug, the ports and passages are the same as in the previous forms with, of course, the necessary changes in the length and direction of the passages. The operation is the same as before.

Figure 7:
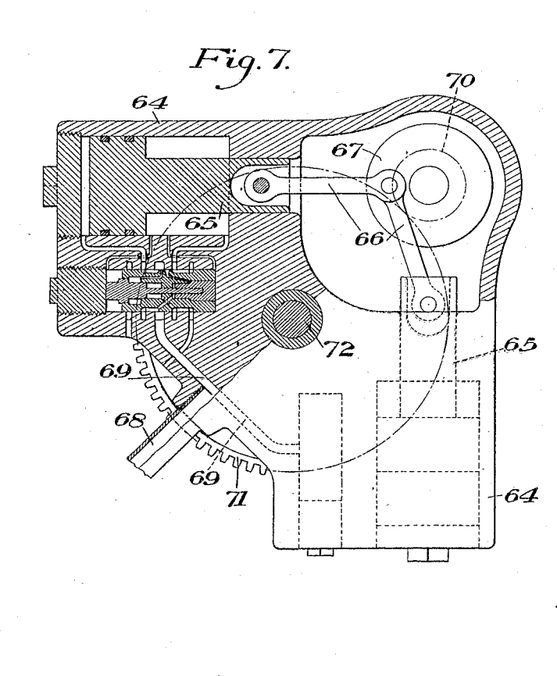
Fig. 7 is a partial sectional view, showing it applied to a portable drill.

In Fig. 7, I show a two-cylinder motor, each cylinder provided with my improved valve system, and the engine being connected to a crank which may be used to drive a drill or may be connected to any other shaft or device to be driven. In this form, 64 is the motive cylinders arranged at right angles to each other and having trunk pistons 65, with connecting rods 66, leading to a crank disk 67 on the shaft to be driven. 68 is a fluid supply from which passages 69 lead to the motors. In this form, I have shown a pinion 70 on the main shaft intermeshing with a toothed wheel 71 on a drill shaft 72, for the purpose of reducing the speed. The operation of the valves in this case is the same as in the previous examples.

Figure 8:
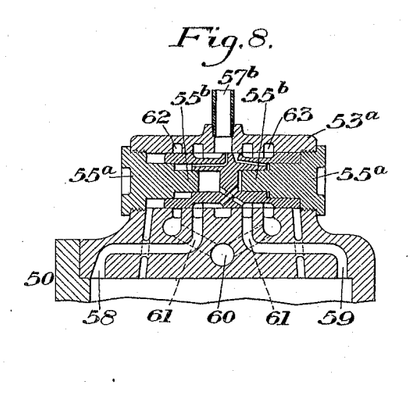
Fig. 8 is a detail sectional view showing a modification.

In the modification shown in Fig. 8, the steam chest or valve casing $53^a$ is shown as having its head $55^a$ in the form of screw plugs, with inward extensions $55^b$ of reduced diameters, which form guides for the valve and take the place of the plugs 56, thereby doing away with the connecting stem 16.

Figure 9:
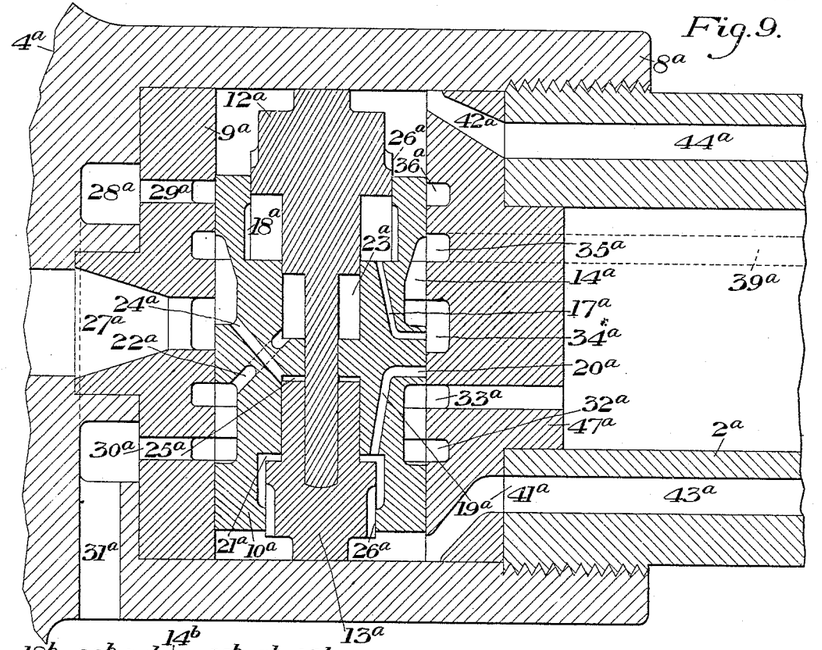

In Fig. 9, I show a section of a form of valve in which motive fluid is alternately supplied during a portion of the valve movement, to each end of the valve from the main supply port, and during the remaining portion of the valve movement from the intermediate portion of the cylinder. The action of the valve is precisely as described in the previous forms, but owing to the absence of a constant pressure on the middle area of the three areas on one end of the valve, the respective areas can be varied, thus permitting more latitude in the forces actuating the movements of the valve. In this form, $4^a$ is the handle containing the valve box $9^a$ and the cylinder $2^a$. The valve $10^a$ working on the stationary plugs $12^a$—$13^a$ is made with unequal diameter holes in its ends fitting $12^a$ and $13^a$, respectively. In this form, the outer ends of plugs $12^a$ and $13^a$ are each reduced in diameter, and the inner walls of the corresponding end holes of the valve are recessed, leaving portions $26^a$ only of the same diameter as the large portions of plugs $12^a$ and $13^a$. I thus provide for passage of motive fluid around the end of plug $13^a$ when the valve is down, as shown, the end $12^a$ being then closed. This condition is reversed when the valve is up. The port $17^a$ leading from pressure surface $18^a$ is placed so that it communicates with initial pressure supply groove $34^a$ when the valve is down and its end is closed by the walls of the valve box $9^a$, when the valve is up. The passage $20^a$ is similarly disposed to alternately open and close communication with pressure surface $21^a$ and initial supply groove $34^a$. The other portions of the device are the same as in Figs. 1, 2, 3 and 4, and the action is the same, except that there is intermittent pressure on surface $21^a$ instead of constant pressure as in the forms previously described. In this form, the two sets of opposing areas, consisting of three areas each, may be alike, if desired, thus facilitating the manufacture of the parts.

Figure 10:
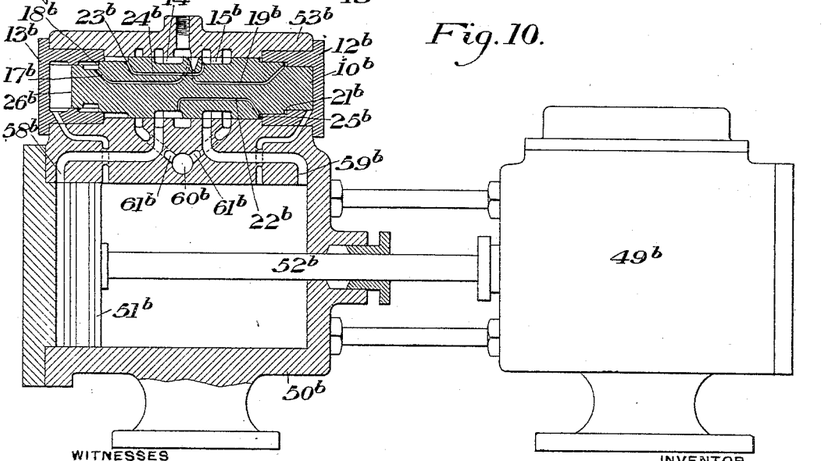
Fig. 10 is a sectional view of a different form of the valve applied to a pump.

In Fig. 10, I show a different form of the valve applied to a pump, in which the two opposing sets of three differential areas are formed by extensions of the valve itself, which in this case is not hollow. The valve casing ends are recessed in the interior thereof, to fit the corresponding end portions of the valve. The connecting passages in the valve body serve identically the same purposes as in the forms already described. In this form $49^b$ is a pump cylinder, $50^b$ the motive cylinder, with piston $51^b$ connecting by piston rod $52^b$ to the pump cylinder. The valve $54^b$, working in the casing or steam chest $53^b$, is formed in a solid piece having extended end portions, each of three differential diameters and two grooves $14^b$ and $15^b$, located on the large middle cylindrical portion. The extreme end surface of the valve at its smallest diameter $10^b$ corresponds to the surface 10 in Figs. 1 to 4. The exterior differential area next toward the center of the valve $21^b$ corresponds to the interior area 21 of Figs. 1 to 4, and the last exterior area $25^b$, going toward center of valve, corresponds with the interior area 25 of Figs. 1 to 4. In the same manner, at the opposite end of the valve, areas $26^b$, $18^b$ and $23^b$ correspond with areas 26, 18 and 23 in Figs. 1 to 4. The interior ports $22^b$ and $24^b$ lead from exterior grooves $14^b$ and $15^b$ to areas $25^b$ and $23^b$, respectively, and ports $19^b$ and $17^b$ from the center cylindrical portion of the valve to areas $21^b$ and $18^b$, respectively. It will be seen that similar numbered parts serve similar functions in this form as in Figs. 1 to 4, and the cycle of action is the same as given for said figures. In this form, the opposing stationary areas to surfaces $25^b$, $21^b$, $10^b$, $23^b$, $18^b$ and $26^b$ are formed by inwardly recessed caps $12^b$ and $13^b$, secured rigidly to casing or steam chest $53^b$, and serve the same purposes as ends 12 and 13 of central plugs in Figs. 1 to 4. The valve in this case is longer, and therefore better suited to a pump or engine than to a hammer.

Figure 11:
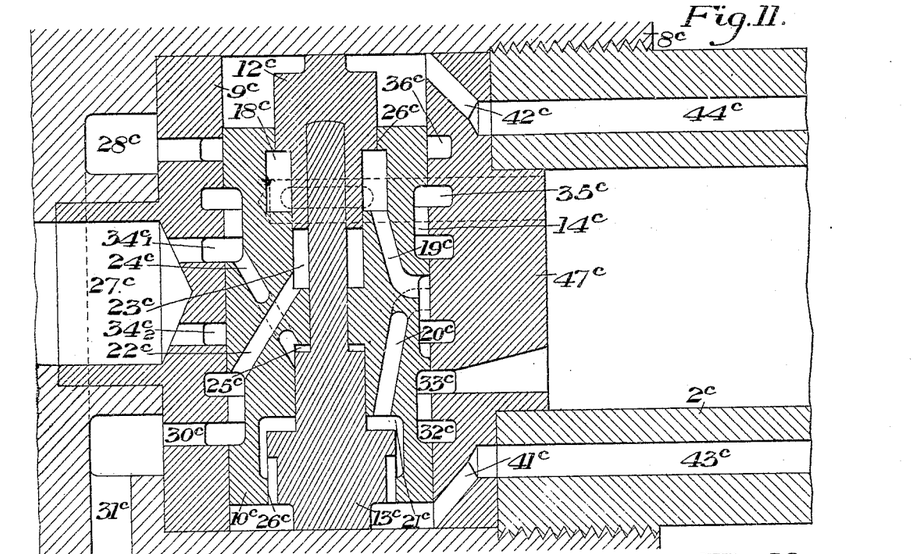
Fig. 11 shows a valve similar to Fig. 3, but having a double admittance port.

In Fig. 11, I show a still different modification of the valve, in that two main admittance ports, connected to a common source of supply are used. In this form, I connect the intermediate area of one end of the valve with a passage always registering with one or the other main admittance ports, while the other end intermediate area portion is alternately connected with one of the main admittance ports and by means of the grooves in plug and end of valve, with motive fluid from the intermediate portion of the cylinder. This form permits of shorter valve travel and more freedom in the arrangement of the connecting passages through the valve body. The action of the valve is exactly similar to those described. The valve box $9^c$ contained in handle $4^c$ differs from the forms shown in Figs. 1 to 4, in that the central groove 34 of the former is replaced by two grooves $34^c$ and $34^{c2}$, each connected to a common source of initial supply $27^c$, corresponding to passage 27. The valve is the same as in Figs. 1 to 4, except that the end portion of port $19^c$ is prolonged on the middle cylindrical surface of the valve $10^c$, so that in any position of the valve, it will always be in communication with the initial supply of motive fluid through either grooves $34^c$ or $34^{c2}$.

Figure 12:
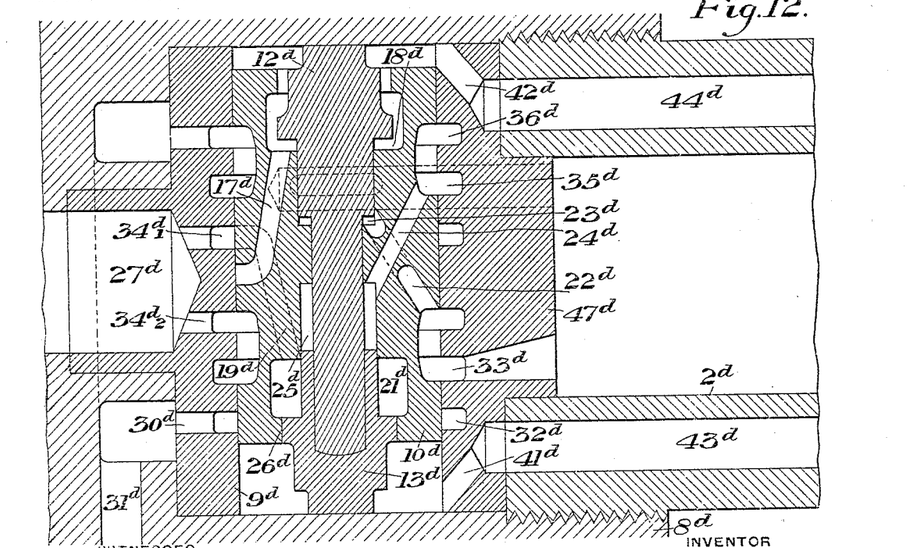
Fig. 12 is also similar to Fig. 3, but having a double admittance port and a different arrangement of valve passages.

In Fig. 12, I show a modified form of the valve with two main admittance ports connected to a common source of supply, but in which the motive fluid is alternately supplied during a portion of the valve movement to each end of the valve from one or the other of the main supply ports, and during the remaining portions of the valve movement, through the passages or grooves of the end portions, from the intermediate portions of the cylinder. This form permits of very short valve movement and simple arrangement of the passages through the valve body. As shown, the two end portions of the valve are identical and the ports arranged to permit instant and simultaneous change of pressures on the various areas. By altering the position or size of different portions, any desired laps or leads to the different areas may readily be made to adapt them for special purposes. In this form, the valve box $9^d$ is the same as in Fig. 11, but the valve and plug are like Fig. 9, having the end portions $12^d$ and $13^d$ reduced at the outer ends and the interior surfaces of end holes enlarged inwardly, forming passages alternately opened and closed as the valve is up or down, as described. The ports $17^d$ and $19^d$ open on the middle cylindrical surface of valve $10^d$, at such points that when the valve is up, as shown, port $19^d$ will open communication from groove $34^{d'}$ to surface to valve surface $21^d$, while port $17^d$ leading to surface $18^d$ is closed at its outer end by the walls of the valve box $9^d$, and when the valve $10^d$ is down, this condition will be reversed, port $17^d$ being in register with groove $34^{d2}$ and port $19^d$ being closed at its end by the walls of valve box $9^d$. The ends $12^d$ and $13^d$ of the plug are shown of equal diameter, as this facilitates manufacture, but it is not essential they should be of the same diameter. The action is the same as described in Fig. 9, with intermittent pressure on surfaces $18^d$ and $21^d$.

The advantages of my invention will be apparent to those skilled in the art. The valve is wholly controlled and actuated by live pressure of the motive fluid, acting upon differential surfaces. Hence, the moving of the valve does not depend upon leakage port or cushioning action. No mechanical connection to the valve is needed, and the valve and its parts are simple and not liable to get out of order. There is no dead point in the motion of the valve and its movements are sure and positive at every point. There is only one moving part in the valve structure, this being the valve body itself, and hence the disadvantages of initial pressure valves, comprising two or more valves one controlling the other are avoided. The presence of thick oil or other retarding fluid will not stop the action, as in the case of valves partially controlled by cushion air or leakage ports. The valve is not liable to be upset or distorted in its end portions, because the differential pressure which causes its movements give small force, and hence its movements, while absolutely positive, do not give a severe hammering action against the ends of the valve casing. Moreover, after the valve has taken one position and the piston has passed the valve-actuating piston ports, the valve is held in this position with increased pressure. This prevents any tendency to rebound or reciprocate slightly in this position. Hence no cushion is required for the valve movements. Holding the valves stationary permits perfect cushioning, stopping and reversing of the piston in hammers, without the aid of other devices therefor. The device is widely applicable in all cases where a moving piston within a cylinder is to be controlled.

Many changes may be made in the form and arrangement of the piston, as well as in the valve and its ports and passages, without departing from my invention, since I claim:—

1. In a fluid pressure device, a cylinder and piston, a single valve having a fluid supply connected thereto, the device having at least four passages connecting the valve with the cylinder, at least two of these passages leading to the end portions of the cylinder and connected to an intermediate part of the valve, and the other two ports leading from an intermediate portion of the cylinder to the end portions of the valve, said valve device having differential areas with fluid connections arranged to hold the valve by fluid pressure at each end of its stroke while the intermediate cylinder ports are open to the exhaust.

2. In a fluid pressure device, a cylinder and piston, a single valve device having a fluid supply connected thereto, the device having at least four passages connecting the valve with the cylinder, at least two of these passages leading to the end portions of the cylinder and connected to an intermediate part of the valve, and the other two ports leading from an intermediate portion of the cylinder to the end portions of the valve, said valve device having at least three differential pressure areas in each half, with fluid connections arranged to hold the valve by pressure at each end of its stroke while the intermediate cylinder ports are open to the exhaust; substantially as described.

3. In a fluid pressure device, a piston and cylinder, and a single valve device having ports connected with a fluid pressure supply and with the cylinder, some of these ports leading to the ends of the valve device and others to intermediate differential areas thereof, the differential valve areas being arranged to positively hold the valve at each end of its stroke independently of the position of the piston in its relation to the cylinder ports in communication with the ends of the valve; substantially as described.

4. In a fluid pressure device, a piston and cylinder, and a single valve having connection with a fluid pressure supply and with the cylinder, the valve having differential areas subjected only to live fluid pressure received from the fluid supply and from the cylinder, the ports being arranged to supply added pressure to hold the valve in its position at each end of the stroke after the piston has moved through a part of its stroke, substantially as described.

5. In a fluid pressure device, a piston and cylinder, and a single valve having a fluid supply connected to its intermediate portion, main passages leading from the intermediate portion of the valve to the opposite end portions of the cylinder, and supplementary passages leading from an intermediate portion of the cylinder to the opposite ends of the said valve, the valve having differential areas arranged to be acted upon solely by live pressure fluid received from the pressure supply direct and from the cylinder and acting to hold the valve at each end of its stroke while the intermediate cylinder ports are open to the exhaust, substantially as described.

6. In a fluid pressure device, a piston and cylinder, a single hollow valve having an exterior portion, of circular cross section, and an interior portion with differential areas, and a relatively stationary plug over which the valve reciprocates, the valve having connection with a fluid supply and with the cylinder and being controlled and actuated wholly by live pressure fluid, substantially as described.

7. In a fluid pressure device, a piston and cylinder, a single hollow valve having a cylindrical exterior portion and an inner portion provided with differential areas, a relatively stationary plug over which the valve reciprocates, the device having a fluid supply passage to the valve, main passages leading from the valve to the main portions of the cylinder, and supplemental passages leading from the intermediate portion of the cylinder to the end portions of the valve, said valve being controlled wholly by live fluid pressure, substantially as described.

8. In a fluid pressure device, a piston and cylinder, a single valve having at least three differential areas acting in one direction, at least three differential areas acting in the opposite direction, and live fluid pressure ports leading direct from the fluid supply and from the cylinder and arranged to act upon said areas to shift the valve, substantially as described.

9. In a fluid pressure device, a piston and cylinder, a single valve having two opposing sets of opposing differential areas with at least three opposing faces in each set, the device having live fluid pressure ports arranged to move the valve endwise by the difference in pressures between the total pressure on three faces of one set and two faces of the opposing set, substantially as described.

10. In a fluid pressure device, a piston and cylinder, a single valve having two sets of opposing differential areas with at least three opposing faces in each set, the valve being started in one direction by the total pressure on three areas on one set acting against two areas on the other set, and being held in its final position through at least a portion of the piston stroke by the larger area of one face of the first set acting against the smaller area of one face of the other set, substantially as described.

11. In a fluid pressure device, a piston and cylinder, a single valve having two sets of opposing differential areas with at least three opposing faces in each set, the valve being started in one direction by the total pressure on three areas of one set acting against two areas on the other set, and being held in its final position through a portion of the piston stroke by the larger area of one face of the first set acting against the smaller area of one face of the other set, and a cylinder passage arranged to supply pressure fluid to a second face of the first set to more firmly hold the valve in its place, substantially as described.

12. In a fluid pressure device, a piston and cylinder, a single valve having differential areas acting in opposite directions, said differential areas being at least three in number in one-half of the valve and acting in the same direction, and fluid pressure ports leading direct from the fluid supply and from the cylinder and arranged to act upon said areas to shift the valve; substantially as described.

13. In a fluid pressure device, a piston and cylinder, a single valve having two sets of opposing differential areas, with at least three opposing faces in each set, the valve being started in one direction by the total pressure on three areas of one set acting against two areas on the other set, the ports being arranged to reduce the effective areas of both sets during the moving of the valve in the same direction, substantially as described.

14. In a fluid pressure device, a piston and cylinder, a single valve having two sets of opposed differential areas, ports arranged to supply a preponderance of total pressure to one set of areas to force the valve in one direction, and means for reducing the preponderance of pressure while the valve is moving in the same direction, substantially as described.

15. In a fluid pressure device, a piston and cylinder, a single hollow valve having at least three differential areas acting in one direction, at least three differential areas acting in the opposite direction, and live fluid pressure ports leading direct from the fluid supply and from the cylinder and arranged to act upon said areas to shift the valve, and a relatively stationary plug upon which the valve moves, substantially as described.

16. In a fluid pressure device, a piston and cylinder, a single hollow valve having two opposing sets of opposing differential areas with at least three opposing faces in each set, the device having live fluid pressure ports arranged to move the valve endwise by the difference in pressures between the total pressure on three faces of one set and two faces of the opposing set, and a relatively stationary plug upon which the valve moves, substantially as described.

17. In a fluid pressure device, a piston and cylinder, a single hollow valve having two sets of opposing differential areas with at least three opposing faces in each set, the valve being started in one direction by the total pressure on three areas on one set acting against two areas on the other set, and being held in its final position through at least a portion of the piston stroke by the larger area of one face of the first set acting against the smaller area of one face of the other set, and a relatively stationary plug upon which the valve moves, substantially as described.

18. In a fluid pressure device, a piston and cylinder, a single hollow valve having two sets of opposing differential areas with at least three opposing faces in each set, the valve being started in one direction by the total pressure on three areas of one set acting against two areas on the other set, and being held in its final position through a portion of the piston stroke by the larger area of one face of the first set acting against the smaller area of one face of the other set, a cylinder passage arranged to supply pressure fluid to a second face of the first set to more firmly hold the valve in its place, and a relatively stationary plug upon which the valve moves, substantially as described.

19. In a fluid pressure device, a piston and cylinder, a single hollow valve having opposed differential areas, ports arranged to supply fluid pressure to said areas to actuate the valve by a predetermined difference of total pressures, means for supplementing the pressure holding the valve in its position while the piston is at an intermediate part of its stroke, and a relatively stationary plug upon which the valve moves, substantially as described.

20. In a fluid pressure device, a piston and cylinder, a single hollow valve having two sets of opposing differential areas, with at least three opposing faces in each set, the valve being started in one direction by the total pressure on three areas of one set acting against two areas on the other set, the ports being arranged to reduce the effective area of both sets during the moving of the valve in the same direction, and a relatively stationary plug upon which the valve moves, substantially as described.

21. In a fluid pressure device, a piston and cylinder, a single hollow valve having two sets of opposed differential areas, ports arranged to supply a preponderance of total pressure fluid to one set of areas to force the valve in one direction, means for reducing the preponderance of pressure while the valve is moving in the same direction, and a relatively stationary plug upon which the valve moves, substantially as described.

22. In a pneumatic tool, a cylinder and piston, a single valve device having a fluid supply connected thereto, the device having at least four passages connecting the valve with the cylinder, at least two of these passages leading to the end portions of the cylinder and connected to an intermediate part of the valve, and the other two ports leading from an intermediate portion of the cylinder to the end portions of the valve, said valve device having differential areas with fluid connections arranged to hold the valve by fluid pressure at each end of its stroke while the intermediate cylinder ports are open, the fluid connections being arranged to cushion the piston with live fluid at the end of its back stroke; substantially as described.

23. In a pneumatic tool, a piston and cylinder, a single valve having at least three differential areas acting in one direction, at least three differential areas acting in the opposite direction, and live fluid pressure ports leading direct from the fluid supply and from the cylinder and arranged to act upon said areas to shift the valve, the piston being a solid imperforate cylinder of the same diameter throughout its working length; substantially as described.

In testimony whereof, I have hereunto set my hand.

CHESTER B. ALBREE.

Witnesses:
A. F. TIBBETTS,
H. M. CORWIN.